5/24/83 OR 4,385,231

United States Patent [19]

Mizutani et al.

[11] 4,385,231

[45] May 24, 1983

[54] UNLOCKING SYSTEM FOR USE WITH CARDS

[75] Inventors: Kazuo Mizutani, Bisai; Hiroshi Egashira, Narashino; Shigeru Kasugai; Masaharu Nakamura, both of Aichi, all of Japan

[73] Assignee: Omron Tateisi Electronics Co., Kyoto, Japan

[21] Appl. No.: 277,692

[22] Filed: Jun. 26, 1981

[30] Foreign Application Priority Data

Jun. 27, 1980 [JP] Japan .................................. 55-88410
Jun. 27, 1980 [JP] Japan .................................. 55-88411

[51] Int. Cl.[3] ................................................ G06K 7/06

[52] U.S. Cl. ................................ 235/382; 235/382.5; 235/375

[58] Field of Search ...................... 235/382, 382.5, 375; 340/825.33

[56] References Cited

U.S. PATENT DOCUMENTS

Re. 29,259 6/1977 Sabsay ............................ 235/382 X
Re. 29,846 11/1978 Genest ............................ 235/382 X
3,800,284 3/1974 Zucker ............................ 235/382 X
3,821,704 6/1974 Sabsay ............................ 235/382 X
3,926,021 12/1975 Genest ............................ 235/382 X

*Primary Examiner*—Harold I. Pitts

*Attorney, Agent, or Firm*—Cushman, Darby & Cushman

[57] ABSTRACT

An unlocking system is used with cards each having recorded thereon a secret number, a plurality of subnumbers, a specifying code for selecting at least one of the subnumbers, and an effective period. The system comprises a card reader for reading the data recorded on the card, a memory for storing a secret number, specifying code and effective period, and a processing unit for unlocking. The processing unit reduces the effective period stored in the memory by 1 in terms of unit time, e.g. 1 day, upon lapse of every unit time, e.g. 1 day or 24 hours. The unit further compares the secret number on the card with the secret number in the memory and gives an unlocking instruction when a match is found between the two secret numbers, with the effective period in the memory exceeding a predetermined period, e.g. 0. When the secret number on the card is not identical with the secret number in the memory, the processing unit checks whether or not the two secret numbers are in a predetermined relation established with use of the subnumber selected by the specifying code in the memory from among the plurality of subnumbers on the card, and gives an unlocking instruction and stores in the memory for renewal the secret number, the effective period and the specifying code on the card.

12 Claims, 19 Drawing Figures

UNLOCKING SYSTEM FOR USE WITH CARDS

BACKGROUND OF THE INVENTION

1. Field of the Invention

The present invention relates to an unlocking system for use with cards, and more particularly to such an unlocking system useful for buildings, such as hotels, having large numbers of rooms which must be locked and which are unlocked frequently by different persons.

2. Description of the Prior Art

Hotels have large numbers of rooms which must be locked. Each of such rooms is usually provided on the door with a mechanical lock, such as a tumbler lock, which is opened and closed with a key. In the case of locks for use with keys, the hotel clerk must hand the key to a guest when he checks in and must receive the key when he checks out. Thus the maintenance of keys is very cumbersome. Further when a key is lost, there arises the necessity of replacing the lock itself to assure security. This requires time and cost.

Accordingly an automatic unlocking system has been proposed which opens a lock in response to an electric signal and which comprises as mounted on a door a card reader, a memory for storing a secret number and a processing unit. A card having a secret number magnetically recorded thereon is used for this system. With this system, the secret number read from the card by the card reader is compared with a secret number stored in the memory, and when a match is found between the two numbers, the lock is opened. Every time a different guest is assigned the same room, a card having a new secret number recorded thereon is handed to the guest. The secret number is changed by a central control unit for concentrically controlling a large number of rooms. Every time the secret number is changed to a new one, the changed new number is transmitted from the central control unit to the memory of the room concerned. Accordingly this system needs a communication cable between the central control unit and the unlocking unit of each room. Such cables are costly to install and require maintenance and inspection periodically.

Another unlocking system is known which does not require the installation of communication cables between the central control unit and the unlocking units at rooms. With this system, a newly issued card bears a new secret number in addition to the old secret number. An unlocking unit installed on the door compares the new secret number on the card with a secret number stored in a memory to check whether or not the two numbers are identical. If the numbers are not identical, the unit subsequently checks whether the old secret number on the card matches the secret number in the memory. If they are found to match, the lock is opened, and the new secret number on the card is stored in the memory. Although random numbers are used as the two secret numbers on the card, the card is simple and easy to counterfeit because the card bears only two numbers. The system therefore involves a security problem.

With either one of the systems described above, the secret number is changed when the room is assigned to a different person, so that if the room is not used subsequently for some other guest, the secret number stored in the memory remains the same as the number on the card for the previous guest. With hotels, the same room frequently remains vacant for several days. In such a case, it becomes possible for the previous guest to use the room without paying the charge until the next guest registers for that room.

SUMMARY OF THE INVENTION

An object of the present invention is to provide an unlocking system for use with cards which can be installed inexpensively without the necessity of providing communication cables between a central control unit and unlocking units at rooms. Since the secret number used for this system is changed every time the user of a particular room changes, there is no need to take special security measures even when the card is lost or discarded.

Another object of the invention is to provide an unlocking system for use with cards, such that when a new card is issued, the relation between the secret number on the new card and the previous secret number stored in the memory of an unlocking unit on the door is not intelligible, the system therefore being very useful for assuring security.

Still another object of the invention is to make it possible to unlock a room with a card only during a scheduled period of time, such that after the period has elapsed, the room is not unlockable unless a new card is issued.

Stated specifically, the invention provides an unlocking system which is used with cards each having recorded thereon a secret number, a plurality of subnumbers, a specifying code for selecting at least one of the subnumbers, and an effective period. The system comprises a card reader for reading the data recorded on the card, a memory for storing a secret number, specifying code and effective period, and a processing unit for unlocking. The processing unit reduces the effective period stored in the memory by 1 in terms of unit time, e.g. 1 day, upon lapse of every unit time, e.g. 1 day or 24 hours. The unit further compares the secret number on the card with the secret number in the memory and gives an unlocking instruction when a match is found between the two secret numbers, with the effective period in the memory exceeding a predetermined period, e.g. 0. When the secret number on the card is not identical with the secret number in the memory, the processing unit checks whether or not the two secret numbers are in a predetermined relation established with use of the subnumber selected by the specifying code in the memory from among the plurality of subnumbers on the card, and gives an unlocking instruction and stores in the memory for renewal the secret number, the effective period and the specifying code on the card.

Since the secret number in the memory is renewed by the card data, the system can be installed at a low cost without the necessity of providing communication cables between the central control unit and unlocking units at the rooms. The card bears a plurality of subnumbers, which are selected by the specifying code in the memory. Therefore, the abovementioned predetermined relation is very unintelligible. Further since the card bears a subnumber and specifying code which do not participate in processing the current secret number, this is very useful for assuring security. The lock can be opened with the card only during the effective period but can not be opened after the lapse of the effective period unless a new card is issued. When the present unlocking system is applied to hotels, the system eliminates the likelihood that if a particular room remains unoccupied after the lapse of the period of stay scheduled for the room, the previous guest will use the room without paying the charge.

The card to be used for the unlocking system is issued by a card issuing device, which comprises a numerical value generator for generating a plurality of subnumbers and a specifying code for selecting at least one of the plurality of subnumbers, an input unit for entering an effective period, a memory for storing a previous secret number and a previous specifying code, a processing unit for preparing a current secret number in a predetermined relation to the previous secret number with use of the previous secret number in the memory and the subnumber selected by the previous specifying code in the memory from among a plurality of current subnumbers obtained from the numerical value generator, a memory control unit for storing in the memory the current secret number and a current specifying code obtained from the numerical value generator, and an encoder for recording on a card the current secret number prepared, the plurality of current subnumbers and the current specifying code obtained from the numerical value generator, and the effective period entered. Thus every time the user changes, the card issuing device issues a card having a new secret number recorded thereon. Once the secret number has been renewed, the previous card is no longer usable for unlocking. This eliminates the need to take special security measures for the preceding cards.

The present invention, which is useful for room doors of hotels, is of course applicable to doors of various other buildings such as apartments, doors of motor vehicles, doors of lockers, etc.

The invention will become more apparent from the following description given with reference to the accompanying drawings.

DESCRIPTION OF THE PREFERRED EMBODIMENTS

Figure 1:
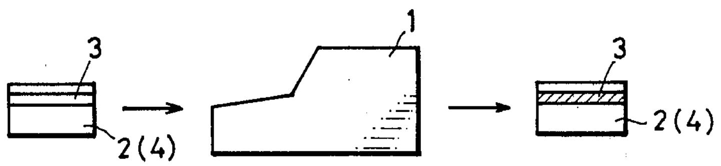
FIG. 1 shows how a card is issued.
Figure 2:
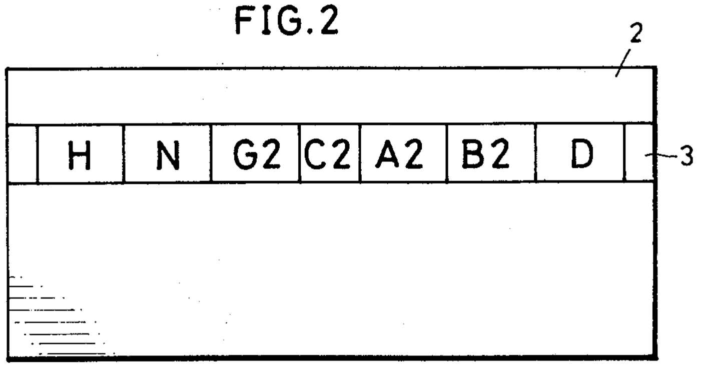
FIGS. 2 and 3 show the card and data recorded on the card.
Figure 3:
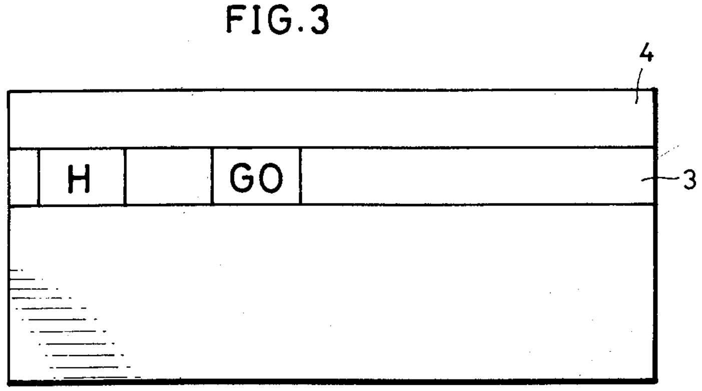
Figure 4:
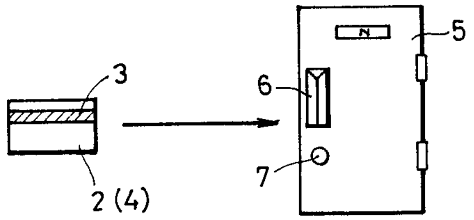
FIG. 4 shows how to unlock a door.

The invention will be described below as embodied for use with hotels having large numbers of rooms with doors which are lockable.

FIGS. 1 to 4 show a general process starting with issuing of a card and ending at unlocking of a door with use of the card. A card issuing device 1 is installed on the front desk of a hotel. When cards 2, 4 are inserted into the issuing device 1, the desired card data are magnetically recorded on a magnetic stripe 3 of each card by the procedure to be described later. There are two types of cards. The card 2 is issued, for example, when a guest checks in and handed to him for access to the room assigned. The door of that room only can be unlocked only within a scheduled period of stay with use of the card 2. The other card 4 is used by a hotel maid. The main uses this card to unlock the door of the room once a day for cleaning. The guest card 2 has recorded thereon a hotel code H, room number N, secret number G, two subnumbers A, B, specifying code C for selecting one of the subnumbers, and the number of days of stay D. Although these numbers N, G, A, B and D are recorded on the card, of course as encoded, the term "number" is used for a better understanding. An affix "2" is attached to the numbers or codes G, A, B and C in FIG. 2 to indicate the number of times the card has been issued for the same unlocking unit. When issued, the card 2 is handed to the person assigned to the room concerned. An unlocking unit is attached to the door 5 of each room and includes a card reader 6, which is attached to the outer side of the door 5. A fixed knob 7 is also attached to the outer side of the door 5. The room number N is shown on an upper portion of the door. The card reader 6 is of the manual scanning type. When the guest inserts the proper card 2 into the card reader 6 for scanning, the lock on the door 5 is opened as will be described later. A card reader of the automatic scanning type is of course usable. The maid card 4 has recorded thereon the hotel code H and a maid secret number GO. The maid similarly inserts this card 4 into the card reader 6 for unlocking.

In the following description, the hotel code, room number, secret numbers, subnumbers, specifying code and the number of days of stay will be referred to only by the corresponding characters H, N, G, GO, A, B, C and D, respectively, when apparent.

Figure 5:
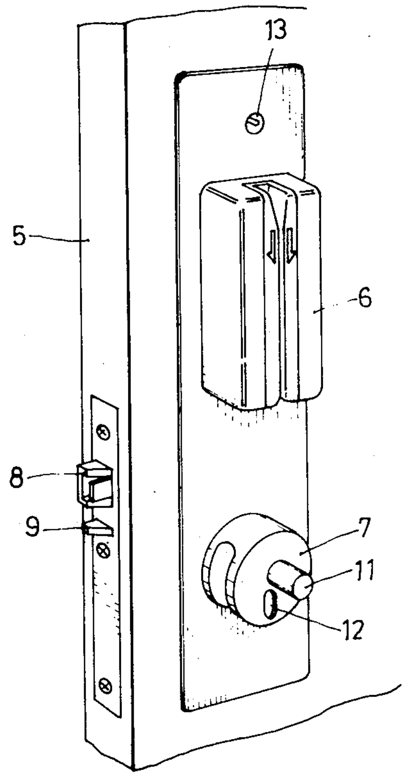
FIG. 5 is a perspective view showing the appearance of a lock and an unlocking unit on the door.

FIG. 5 shows the appearance of a lock attached to the door of each hotel room. The lock has an automatic locking function. When the door 5 is closed, a trigger bolt 9 functions to fix a latch 8 for automatic locking. When the proper card 2 or 4 is inserted into the card reader 6, the unlocking solenoid 69 (FIG. 9) to be described later is energized, and a pilot lamp 13 goes on. If a push button 11 on the knob 7 is depressed, the latch is released to unlock. The lock is provided with auxiliary means for mechanical unlocking with use of a key. When the key is inserted into a keyhole 12 and then turned, the lock is opened. The door 5 is provided on its inner side with an inner handle (not shown). The lock can be unlocked as desired by the handle. Locks having such automatic unlocking function is well known.

Figure 6:
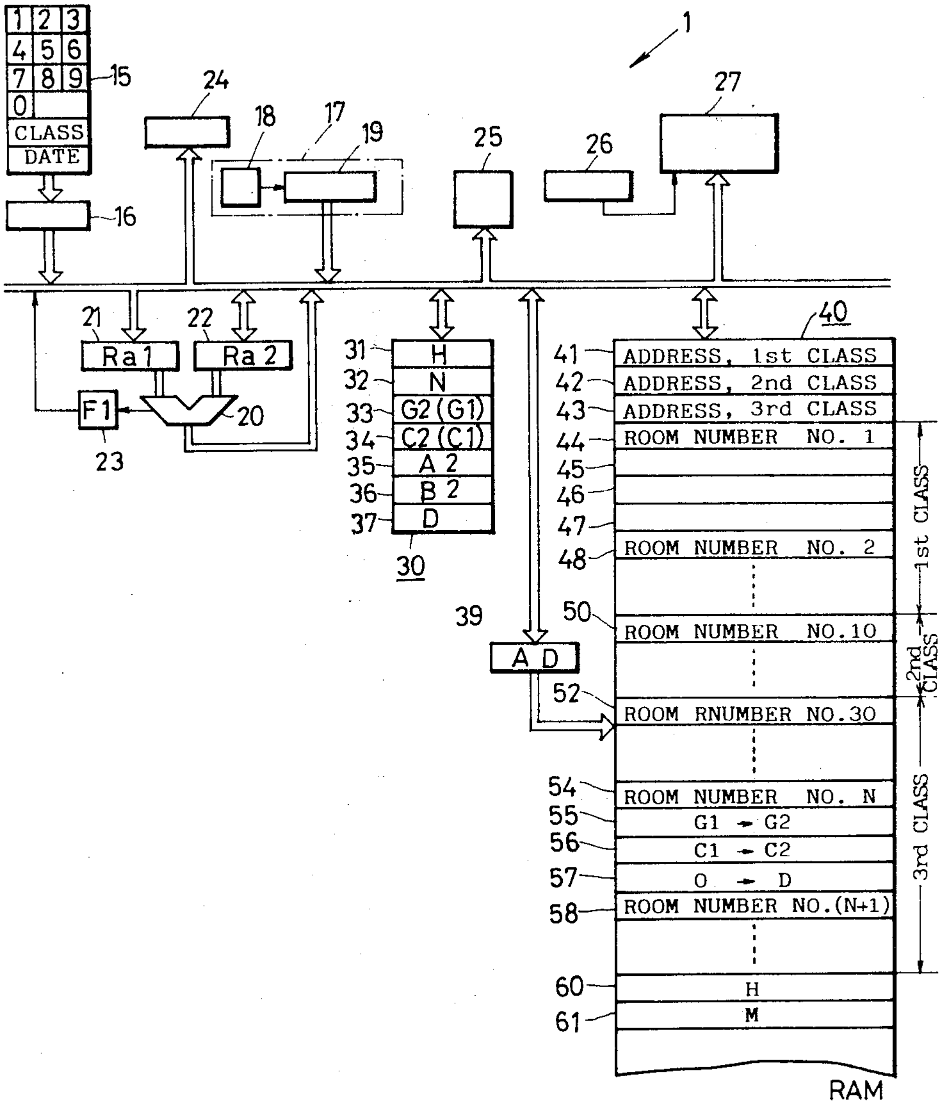
FIG. 6 is a block diagram showing the interior construction of a card issuing device.

FIG. 6 shows the interior construction of the card issuing device 1. The card issuing device 1 comprises a keyboard 15, an input buffer-register 16 therefor, random number generator 17, display 24, encoder 25, timepiece 26, control circuit 27 therefor, arithmetic and logical unit (ALU) 20, arithmetic registers (Ra1, RA2) 21, 22, flag (F1) 23 for showing the result of operation, a group of registers 30 for storing various items of data, RAM 40 for storing data and address specifying register (AD) 39 for the RAM 40. The keyboard 15 includes keys for the numbers 0–9, and keys "DATE" and "CLASS" for the date and class of rooms. The random number generator 17 comprises an oscillator 18 and a counter 18 for counting up the output pulses of the oscillator 18. The register group 30 includes seven registers 31–37 for loading the seven kinds of card data individually. The RAM 40 has areas 41–43 for storing information about the classes of the rooms, areas 44–58 for storing information relating to the rooms, an area 60 for storing the hotel code H, and an area 61 for storing the number M of rooms. In the present embodiment, the rooms are divided into the first, second and third classes. The first class rooms have room numbers 1–10, the second class rooms have room numbers 11–29, and the third class rooms have room numbers 30 and up. In the areas 44–58 are stored the room number N, secret number G, specifying code C and number of days of stay D at the location for each room. The area 41 has stored therein the head address of the area for storing the information about the first class rooms, i.e. the address of the location 44 in the present case. Similarly, the areas 42, 43 have stored therein the head addresses of the areas for storing the information about the second and third class rooms, i.e. the addresses of the locations 50, 52, respectively. FIG. 6 does not show the program memory.

An affix "1" is attached to previous card data G, A, B and C to represent the same, and current data items are represented by G2, A2, B2, C2. Current G2 is prepared by the card issuing device 1 from previous G1 and C1, and current A2 or B2. C1, A2, B2 are random numbers which are read out from the random number generator 17. The subnumbers A, B may be of any number of figures, but numbers of three or four figures are preferable. Previous C1 is a code read out when previous G1 was prepared. When current G2 is prepared, C2 is read out for the subsequent secret number. Either "1" or "0" is used as the specifying code C. The subnumber A or B is selected according to the value. With the present embodiment, the subnumber A is selected when the code C is 1, and the subnumber B when the code C is 0.

There are various methods of calculation for the preparation of G2. Examples are:

$$G2 = G1 + (A2 \text{ or } B2) \quad (1)$$

$$G2 = G1 \times (A2 \text{ or } B2) \quad (2)$$

$$G2 = m \times G1 + n \times (A2 \text{ or } B2) \quad (3)$$

$$G2 = (G1)^2 + (A2 \text{ or } B2) \quad (4)$$

wherein m and n are constant numbers which are stored in the RAM 40 of the card issuing device 1 and in the RAM 90 of unlocking unit 10 to be described later. In this way the current secret number G2 is so prepared that it has a predetermined relation to the previous secret number G1. Equation (1) is used for the present embodiment.

For example, a card for a room with a room number N is issued. It is assumed that the locations 54, 55, 56 of the storing area for N in RAM 40 have stored therein N, previous G1 and C1. Further 0 is stored in the location for stay days when the room is unoccupied. The room with N is vacant, and 0 is stored in the location 57. The locations of the areas 41–61 are addressed with consecutive numbers.

Figure 7A:
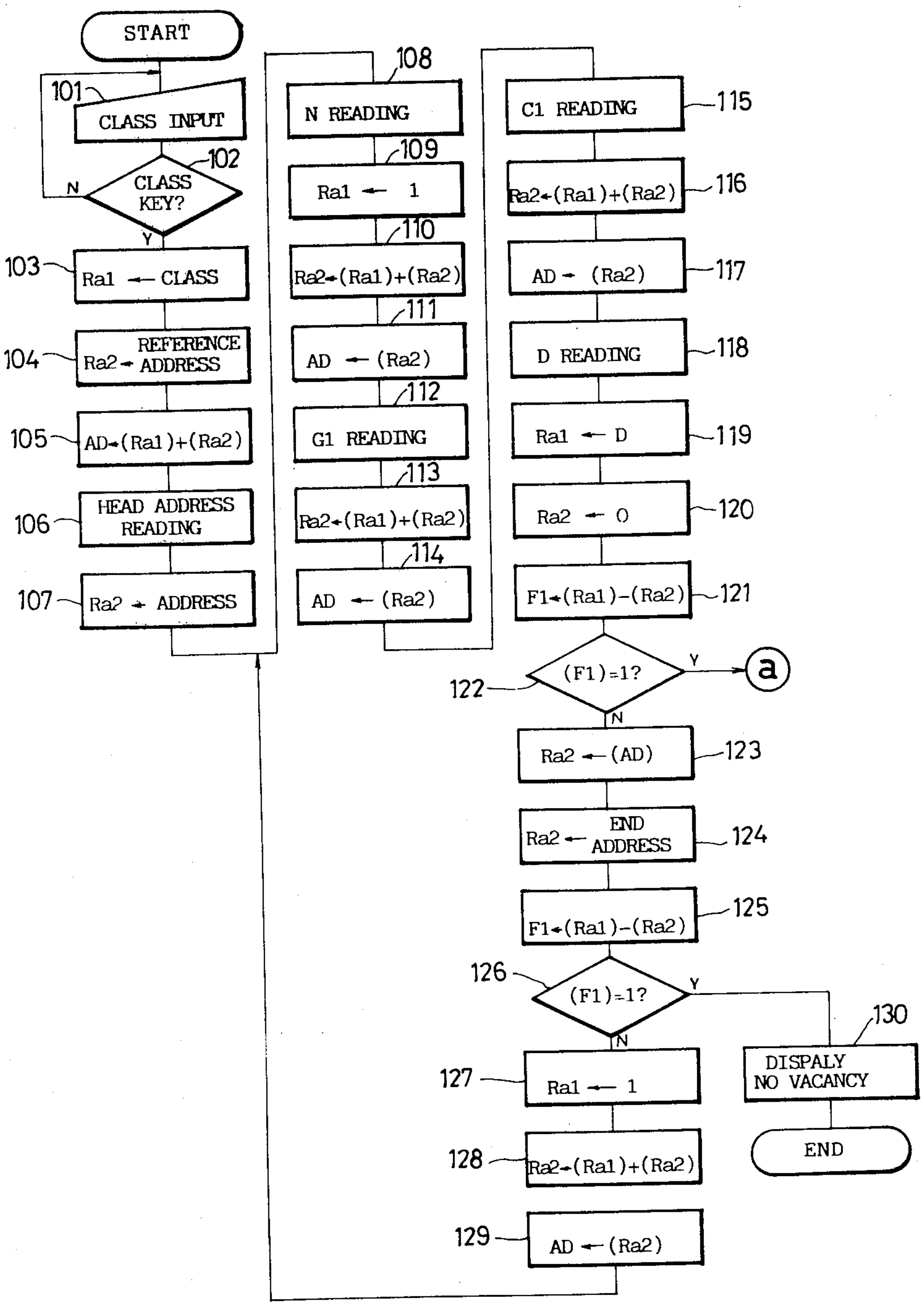
FIG. 7 is a flow chart showing the operation of the card issuing device.
Figure 7B:
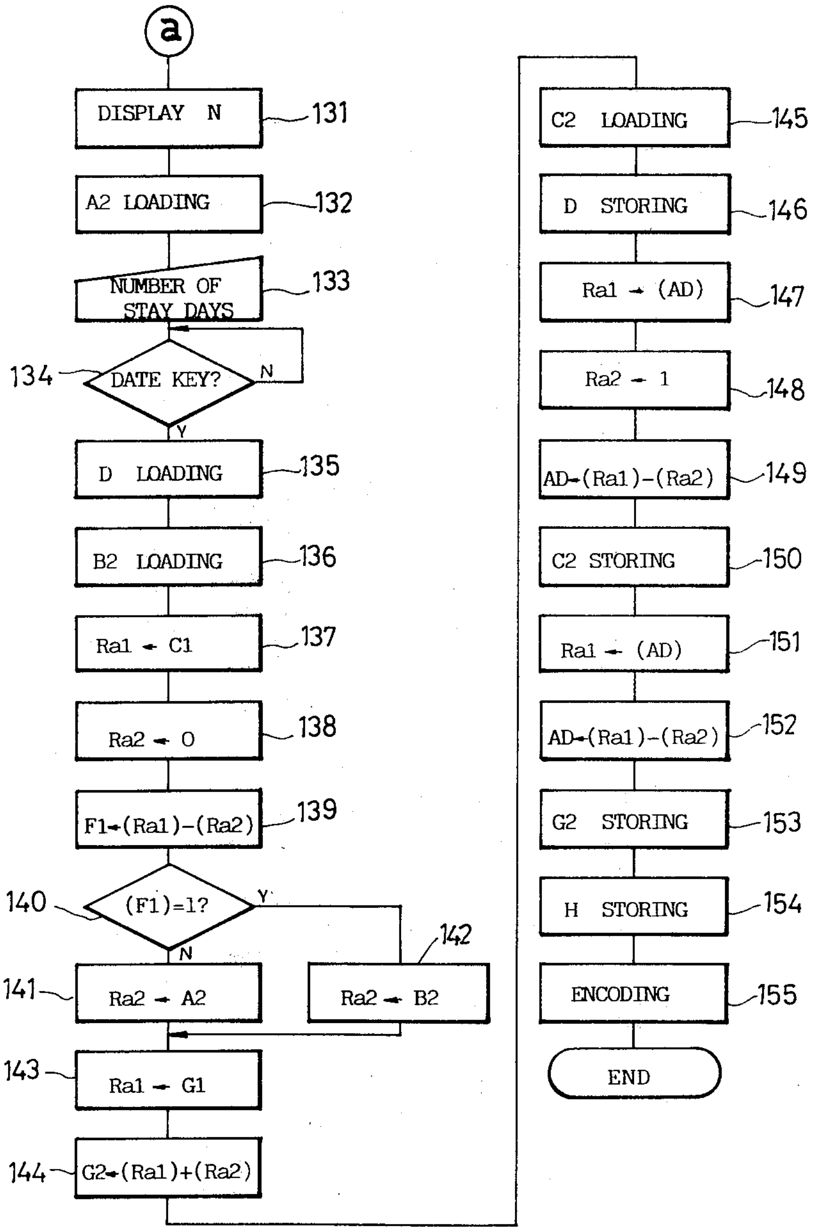

FIG. 7 shows the steps of a card issuing operation by the device 1. In the following description, the registers Ra1, Ra2, AD and flag F1 will be represented merely by Ra1, Ra2, AD and F1 when apparent. With reference to FIG. 7, when a numerical value indicating the class of the room is entered by the keyboard 15, the input is loaded into the buffer-register 16 (step 101). When the key "CLASS" is depressed in the keyboard 15 (step 102), the class indicating value of step 101 is transferred to the register Ra1 (step 103). Subsequently a reference address is loaded into the register Ra2 (step 104). By the reference address is meant by the address of the location (not shown) immediately preceding the location 41. If the address of the location 41 is 41, the address 40 is loaded into Ra2. The data of Ra1, Ra2 is then added, and the address register AD is loaded with the result (step 105). Since 1 is added to the reference address, the location 41 is addressed by this operation when a first class room is specified, and the location 42 or 43 is addressed in the case of second or third class. The head address of the area for the class stored in the location (one of 41–43) specified by the address in AD is read and transferred to AD and Ra2 (steps 106, 107). If a third class room is specified, address of the location 52 is read from the location 43. By the location 52 being specified by this address, the room number 30 stored in the location 52 is read and loaded into the register 32 (step 108).

Next 1 is loaded into Ra1 (step 109), the data in Ra1, Ra2 is added, and Ra2 is loaded with the result (step 110). Subsequently the data in Ra2 is transferred to AD, and the location (not shown) next to the location 52 is addressed (step 111). Since the location next to the location 52 has stored therein previous G1 of the room with number 30, G1 is read out and transferred to the register 33 (step 112).

There is 1 in Ra1 (step 109), and Ra2 has stored the address of the location next to the location 52. With the resulting sum, further next location is addressed wherein C1 is stored (steps 113, 114). C1 is read out by this address and transferred to the register 34 (step 115).

Similarly the contents of Ra1, Ra2 are added (step 116). By the result of the addition, the location is addressed in which the number of days of stay is stored (step 117). D is read out and transferred to the register 37 (step 118). The D is loaded also into Ra1 (step 119). Then Ra2 is cleared of the data, i.e. 0 (step 120). Ra2 is subtracted from Ra1. If the result of subtraction is 0 (D=0), the flag F1 is set at 1. Otherwise, the flag F1 is set at 0 (step 121). When F1 is 1, the number of days of stay, D, is 0, and the room is unoccupied. Step 131 therefore follows. When F1 is 0, the room is occupied. Step 123 follows to search for other room (step 122).

In step 123, the contents of AD are transferred to Ra2, the end address is loaded into Ra1 (step 124), and Ra2 is subtracted from Ra1 (step 125). The end address of the area containing the information relating to each room of every class is referred to as such. For example, in the case of the first class, it is the address of the location storing the number of days of stay for the room number 9. If the address of the location for reading D in step 118 is the end address, the result of subtraction in step 125 is 0, in which case F1 is set at 1. Otherwise, F1 is reset at 0. If F1 is 1 (step 126), all the rooms in the class concerned have been completely checked. Since no vacant room has been found, "NO VACANCY" is shown on the display 24, whereby the process is completed. (Step 130) If F1 is 0 (step 126), all the rooms have not been checked, so that Ra1 is loaded with 1 (step 127), and Ra1 and Ra2 are added, whereby the address of the location in which the room number to be checked next is stored. The result of the addition is loaded into Ra2 (step 128) and transferred to AD to address the next location (step 129). Step 108 thereafter follows again to read the room number N, secret number G1 and specifying code C1 in the same manner as above. The data is transferred to the registers 32, 33, 34, and the number of days of stay is read to check as to whether or not it is 0.

In this way the rooms are checked for the day number D. If the number D for the room with room number N is found to be 0, the room number N is shown on the display 24 and is also transferred to the register 32 (step 131). The count on the counter 19 at this time is read from the random number generator 17 as a subnumber A2 and is loaded into the register 35 (step 132). The number of days of stay and "day" are entered by keyboard 15 (steps 133, 134). Upon entry of day, the keyed-in number D is loaded into the register 37 (step 135). As in step 132, a random number is read from the random number generator 17 and loaded into the register 36 as a subnumber B2 (step 136).

Previous C1 in the register 34 is transferred to Ra1 (step 137), the register Ra2 is loaded with 0 (step 138), and Ra2 is subtracted from Ra1 in ALU 20, whereby whether previous C1 is 1 or 0 is checked. If C1 is 1, the subtraction result is 1. F1 is then reset at 0. Conversely if C1 is 0, the subtraction result is 0. At this time, F1 is set at 1 (step 139).

The state of F1 is checked (step 140). If it is 0, the subnumber A2 is transferred from the register 35 to the register Ra2 (step 141). When F1 is 1, the subnumber B2 is transferred from the register 36 to the register Ra2 (step 142). Previous G1 is transferred from the register 33 to the register Ra1 (step 143). Ra1, Ra2 are added, and the result is transferred to the register 33 as current G2 (step 144). It will be understood that by steps 140-144, current G2 is calculated from Equation (1) with use of A2 or B2 selected by previous C1, and previous G1.

Since the count on the counter 19 of the generator 17 ends with a figure 1 or 0, this is loaded into the register 34 as current C2 (step 145). Utilizing the address used for reading the number of days of stay in step 118, D of register 37 is stored in the location (in this case, 57) for the stay day number for N in the RAM 40, whereby the number of days of stay in RAM 40 is renewed (step 146).

The contents of AD, i.e. the address of the location 57 is transferred to Ra1 (step 147), 1 is loaded into the register Ra2 (step 148), Ra2 is subtracted from Ra1, the result is transferred to AD (step 149), whereby the location 56 is addressed. Current C2 in the register 34 is stored in the location 56 (step 150). Similarly the data in AD is transferred to the register Ra1 (step 151), Ra2 is subtracted from Ra1, the result is transferred to AD, the location 55 is addressed (step 152), and current G2 in the register 33 is stored in the location 55 (step 153). Thus the contents G1, C1 of the locations 55, 56 are changed to G2, C2 respectively. The hotel code H is transferred from the area 60 of the RAM 40 to the register 31 (step 154). Finally all the items of data H, N, G2, C2, A2, B2 and D in the group of registers 30 are sent to the encoder 25 and encoded in the card 2 (step 155).

Although N, G1 and C1 are read from RAM 40 and loaded into the registers 32, 33 and 34 in the above process (steps 108, 112, 115) for each room, the rooms may first be checked as to D only, and after a room in which D is 0 is found, N, G1 and C1 relating to the room may be read out.

Figure 8:
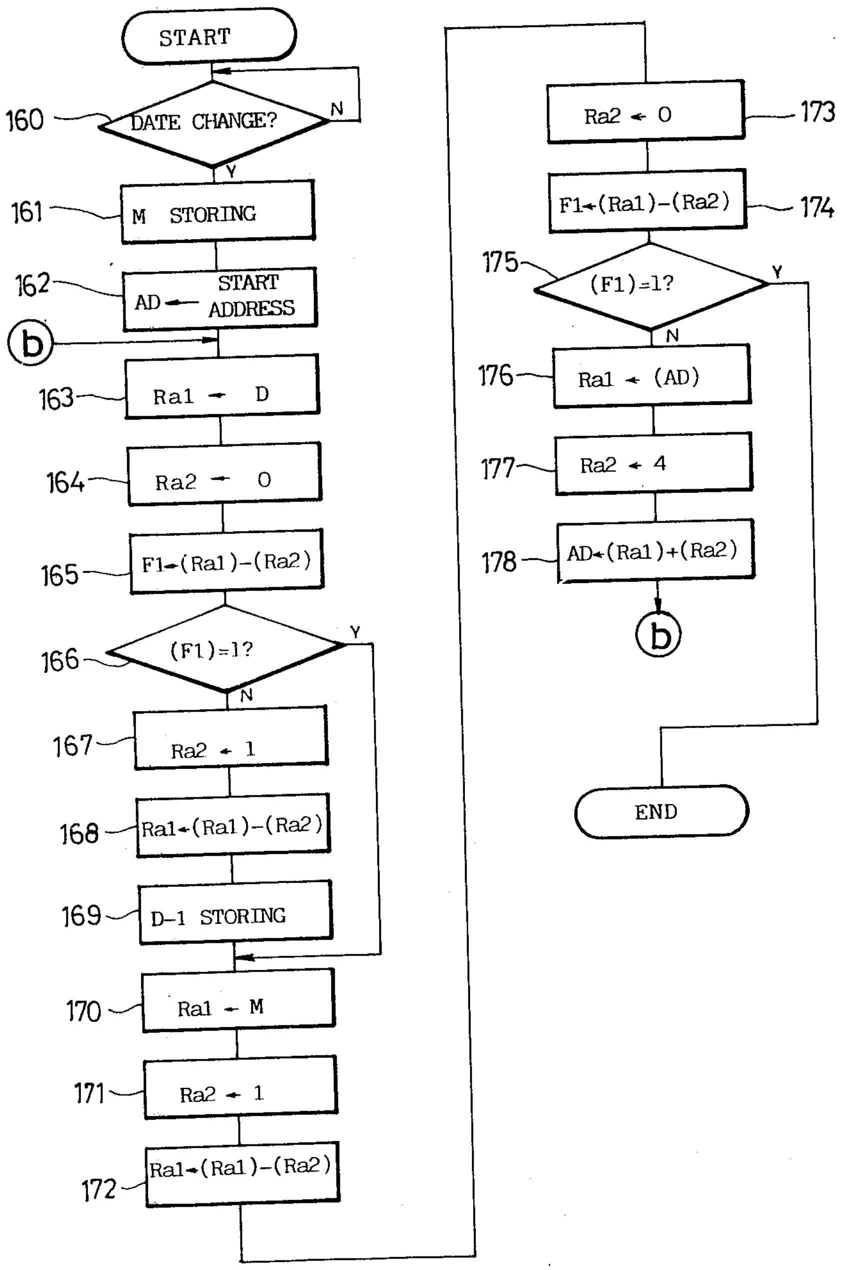
FIG. 8 is a flow chart showing an operation for renewing the number of stay days stored in a memory of the card issuing device, using the output of a timepiece.

When the guest checks out, the number of days of stay stored in the RAM 40 for the room concerned may be changed to 0. However, in response to a day or date change signal from the timepiece 26, 1 may be subtracted from all the stay day numbers (except where 0) stored in the RAM 40, for example, at 10:00 a.m. to renew the number of days of stay. FIG. 8 shows the steps of renewing the number of days of stay.

With reference to FIG. 8, a day or date change signal is produced from the timepiece 26 (step 160), whereupon the total number of rooms, M, included in the program is stored in the area 61 of the RAM 40 (step 161). The address of the location (i.e. location 47 in the present case), where the stay day number of the first room stored in the RAM 40 is stored, is loaded into AD (step 162). Since the location 47 is addressed by AD, the stay day number D is read from the location and transferred to Ra1 (step 163). Next Ra2 is cleared (0) in step 164, and Ra2 is subtracted from Ra1. If the result is 0, F1 is set at 1. Otherwise, F1 is reset at 0 (step 165). When F1 is 1 (step 166), step 170 follows since the readout D is 0. When F1 is 0, 1 is subtracted from D in step 167, in which Ra2 is first loaded with 1, Ra2 is subtracted from Ra1 (step 168), and the result (D−1) is stored in the original location 47 (step 169).

To check whether or not the subtraction process has been completed for all the stay day numbers, the number of rooms, M, is transferred from the area 61 to Ra1 (step 170), Ra2 is loaded with 1 (step 171), Ra2 is subtracted from Ra1, and the result is loaded into Ra1 and also stored in area 61 (step 172). In this way, 1 is subtracted from the room number M every time the subtraction is conducted for one stay day number. Accordingly the number M is indicative of the number of areas for stay day numbers for which the subtraction process has not been carried out. To check whether or not the number of rooms, M, is 0, Ra2 is cleared to 0 (step 173), Ra2 is subtracted from Ra1 and F1 is set to 1 if the result is 0. Otherwise F1 is reset to 0 (step 174).

The state of F1 is then checked (step 175). If it is 1, the process for the areas for all the stay day numbers has been completed, hence termination. When F1 is 0, data is transferred from AD to Ra1 to effect the process for the location of the next stay day number (step 176). Ra2 is loaded with 4 (step 177), Ra1 and Ra2 are added and the result is loaded into AD (step 178). Step 163 thereafter follows to read the day number at the next location to conduct similar subtraction successively.

Figure 9:
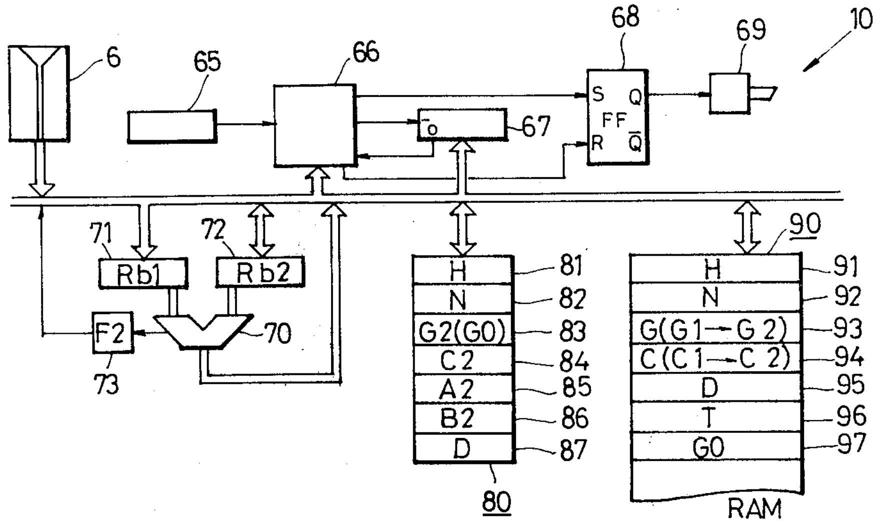
FIG. 9 is a block diagram showing the interior construction of the unlocking unit.

FIG. 9 shows the unlocking unit 10 on the door 5. The unlocking unit 10 comprises the card reader 6, timepiece 65, control circuit 66 including an instruction register, decoder, interruption control circuit and the like, timer 67, flip-flop (FF) 68, unlocking solenoid 69, ALU 70, arithmetic registers (Rb1, Rb2) 71, 72, flag (F2) 73 for showing the results of calculation, a group of registers 80 for storing various items of data and RAM 90 for storing data. In this embodiment, the unit is held in unlocking state for a predetermined period of time T after unlocking. Upon lapse of the time T, the unit is returned to locking state. A timer 67 is used for measuring the time T. The group of registers 80 includes seven registers 81-87. The RAM 90 has locations 91–97 for storing H, N, G, C, D, T and G0.

The unlocking unit 10 reads data from the card 2 or 4 and releases the lock when the secret number G in the card data is in one of the following relations to the secret number G or G0 stored in the location 93 or 97 in the RAM 90 and, at the same time, when the stay day number D in the location 95 of RAM 90 is not 0. One of the predetermined relations involving the secret numbers is that the secret number G read by the card reader 6 is identical with or matches the secret number G in the location 93. Another relation is that the secret number G read by the card reader 6 is in the relation of Equation (1) relative to the secret number G in the location 93, Equation (1) involving the subnumber A or B on the card and the specifying code C in the location 94. Suppose the card data includes G2, A2, B2 and the locations 93, 94 contain G1, C1. The lock is released when the secret numbers G1 and G2 are in the relation of Equation (1) established with use of the subnumber A2 or B2 selected by the specifying code C1. Since in this case the room with the number N is assigned to a changed guest, G2, C2 on the card are stored in the locations 93, 94 of the RAM 90 in place of G1, C1. Still another relation is that the maid secret number G0 on the maid card 4 is identical with the secret number G0 stored in the location 97 of RAM 90.

Figure 10A:
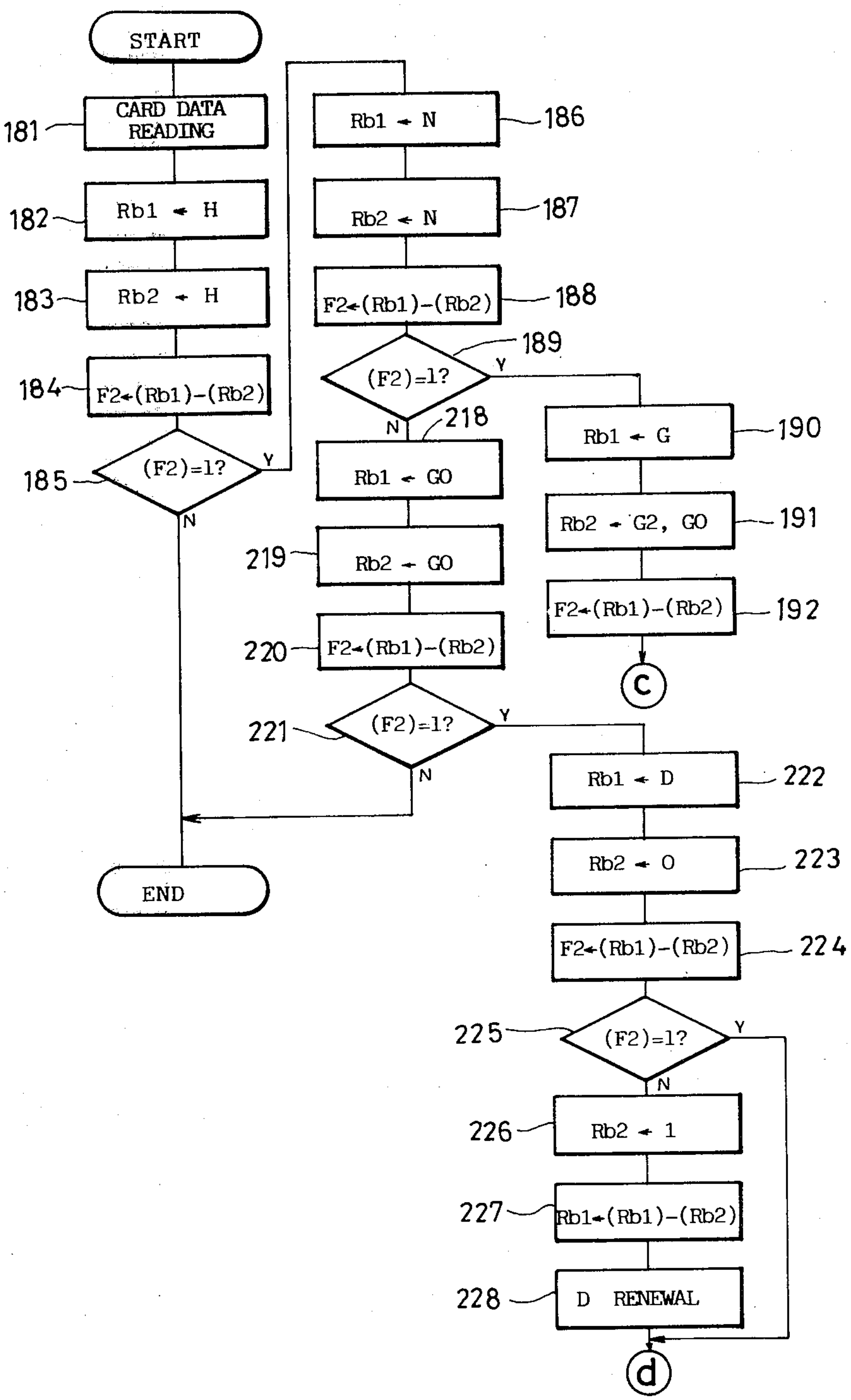
FIG. 10 is a flow chart showing the operation of the unlocking unit.
Figure 10B:
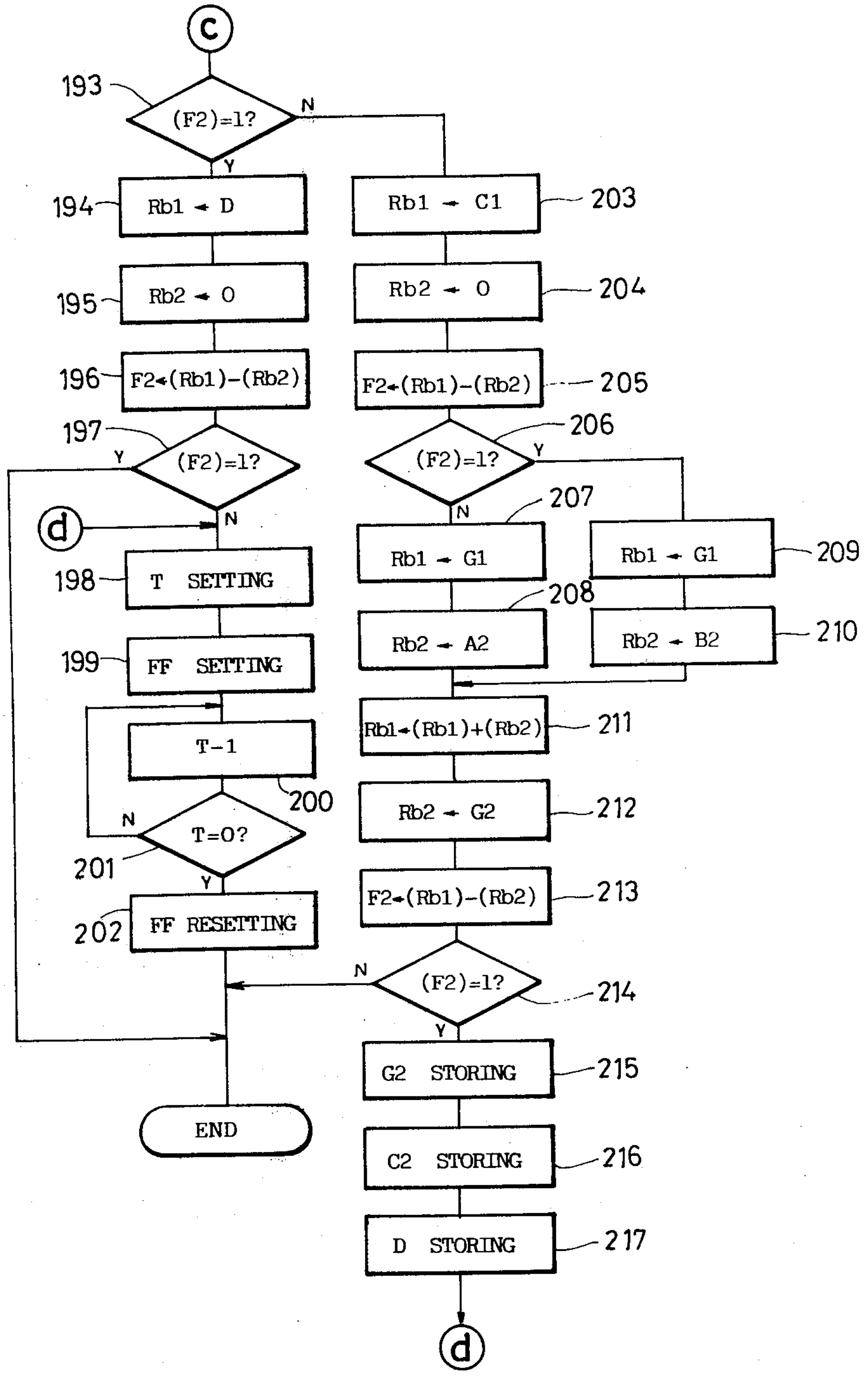

It is now assumed that the areas 91, 92, 96, 97 of the RAM 90 have stored therein the hotel code H, room number N, time setting T for the timer 65 and maid secret number G0, respectively, with the flip-flop 68 in reset state. With reference to FIG. 10 showing the steps of unlocking with the unit 10, a card 2 or 4 is inserted into the card reader 6, whereupon the data on the card 2 or 4 is read and loaded into the group of registers, 80 (step 181). H is transferred from the location 91 in the RAM 90 (step 182) to Rb1 (step 182), and H in the register 81 is transferred to Rb2 (step 183) to check the hotel code. Rb2 is subtracted from Rb1. If the result is 0, F2 is set to 1. Otherwise, F2 is reset to 0 (step 184). The state of the flag F2 is then checked. F2 which is 1 indicates that the card data H is authentic, so that step 186 follows to check the room number N. If the flag F2 is 0, this indicates that the card is counterfeit. The process is terminated without unlocking.

As is the case with the checking of the hotel code H, the room number N in the location 92 of RAM 90 is transferred to Rb1 in step 186. N in the register 82 is transferred to Rb2 (step 187). Rb2 is subtracted from Rb1. If the result is 0, F2 is set at 1 (step 188). F2 which is 1 (step 189) indicates that the number N is an authorized one. Step 190 follows for checking the secret number G. If F2 is 0, the process is terminated without unlocking.

It is assumed that the registers 83-87 are loaded with current G2, C2, A2, B2 and D and that the locations 93, 94, 95 of RAM 90 have recorded therein previous G1, C1 and D. In step 190, G1 in the location 93 is transferred to Rb1. Next, G2 or G0 in the register 83 is transferred to Rb2 (step 191). Rb2 is subtracted from Rb1. If the result is 0, F2 is set to 1 (step 192). Otherwise, F2 is reset to 0. The state of F2 is checked (step 193). If it is 1, step 194 follows. When it is 0, step 203 is executed.

If the location 93 of RAM 90 contains G1, while the register 83 contains G2, these secret numbers are not identical, hence "NO" for step 193. This is the case when a new card has been issued to a new guest for room number N. Subsequently, therefore, the two numbers G1 and G2 are checked as to whether or not they have the relation of Equation (1). In step 203, C1 is transferred from the location 94 in RAM 90 to Rb1. Rb2 is then loaded with 0 (step 204). Rb2 is subtracted from Rb1. If the result is 0, F2 is set to 1, or if it is 1, F2 is reset to 0 (step 205). When F2 is 0, step 207 is executed for selecting A2, and if it is 1, step 209 follows for selecting B2 (step 206). In either case, G1 in the location 93 is transferred to Rb1 first (steps 207 and 209). When F2 is 0, A2 is transferred from the register 85 to Rb2 (step 208). If F2 is 1, B2 is transferred from the register 86 to Rb2 (step 210). G1 in Rb1 is added to A2 or B2 in Rb2, and the result is loaded into Rb1 (step 211). G2 is transferred from the register 83 to Rb2 (step 212) and Rb2 is subtracted from Rb1. If the result is 0, F2 is set to 1, whereas if it is 1, F2 is reset to 0 (step 213). The data in Rb1 is the sum of G1 and A2 or B2, and the data in Rb2 is G2, so that the subtraction result, when 0, means that the secret numbers G1 and G2 satisfy the relation of Equation (1). Step 214 therefore follows for unlocking. Unless the subtraction result of step 213 is 0, G1 and G2 are not in the relation of Equation (1). Consequently if F2 is 0 (step 214), the process is terminated without unlocking. Thus unless the secret number stored in RAM 90 and the secret number borne on the card 2 are in the predetermined relation (e.g. Equation (1)), it is impossible to unlock.

When step 214 reveals that F2 is 1, current G2 in the register 83 is stored in the location 93 of RAM 90 for the renewal of the secret number (step 215). Further C2 in the register 84 is stored in the location of RAM 90 for renewal in preparation of the card to be issued subsequently (step 216). Further D in register 87 is stored in the location 95 of RAM 90 (step 217).

After the foregoing processing, time setting T stored in the location 96 of RAM 90 is read, and the timer 67 is set for the time (step 198). At the same time, the flip-flop FF is set (step 199), whereupon the solenoid 69 is actuated, which in turn opens the lock. Time is measured by subtracting 1 from the contents of the timer 67 at a predetermined interval until the contents reduce to 0 (step 200), whereupon (step 201) FF is reset (step 202). Thus the unit is held in unlocking state while FF is in set state during the predetermined period of time T. The time measuring step 200 may alternatively be effected by subtraction with use of Rb1 and Rb2.

Since G1 in the location 93 of RAM 90 has been renewed to G2 by step 215, the data in the register 83 matches the data in the location 93 when the same card is to be used for unlocking ("YES" for step 193). In this case, step 194 follows for checking the stay day number. First, D in the location 95 of RAM 90 is transferred to Rb1, and 0 is then loaded into Rb2 (step 195). Rb2 is subtracted from Rb1. When the result is 0, F2 is set to 1. Otherwise, F2 is reset to 0 (step 196). F2, if 1, means that D is 0, so that in this case the process is terminated without unlocking. If D is not 0 (F2=0), step 198 is executed to set FF to hold the unit in unlocking state for the predetermined period of time T.

Since the maid card 4 contains no room number data N (zero contents), step 189 proves "NO." In this case, the maid secret number G0 is checked in step 218. First, G0 in the location 97 of RAM 90 is transferred to Rb1, and G0 in the register 83 is then transferred to Rb2 (step 219). Rb2 is subtracted from Rb1. If the result is found 0, F2 is set to 1. If otherwise, F2 is reset to 0 (step 220). When F2 is 0, the secret number in the location 97 does not match that in the register 83, with the result that the process is terminated without unlocking (step 211).

When F2 is 1, D in the location 95 of RAM 90 is transferred to Rb1 (step 222), 0 is loaded into Rb2 (step 223) and Rb2 is subtracted from Rb1 to check whether or not D is 0 (step 224). If the subtraction result is 0, F2 is set to 1. If otherwise, F2 is reset to 0, in which case D is not 0. Step 226 therefore follows. Rb2 is loaded with 1, 1 is subtracted from D in Rb1 and the result is loaded into Rb1 (step 227). The data (D−1) in Rb1 is stored in the location 95 of RAM 90 for the renewal of stay day number (step 228). The hotel maid unlocks the room once a day for cleaning. Accordingly the number of remaining days of stay stored in RAM 90 is reduced by 1 upon lapse of every day when the maid unlocks the room.

After 1 has been subtracted from the stay day number D in the location 95 of RAM 90 (step 228), and also when the day number D is 0 (step 225), an unlocking process is executed by step 198.

Figure 11:
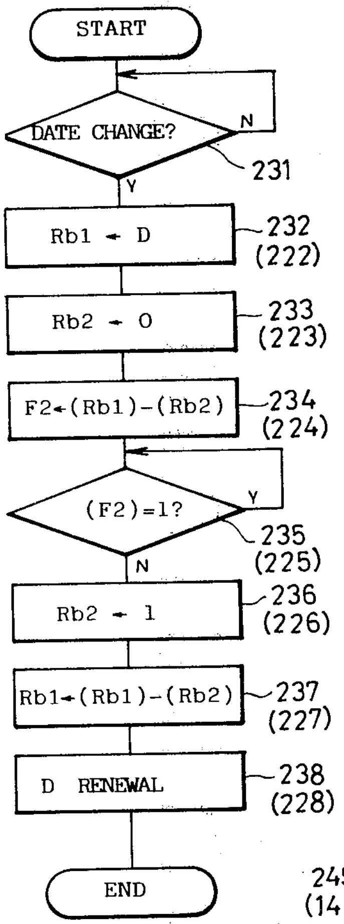
FIG. 11 is a flow chart showing an operation for renewing the number of stay days stored in a memory of the unlocking unit, using the output of a timepiece.

The daily renewal (subtraction of 1) of the stay day number stored in the area 95 of RAM 90 can be effected also in response to a day or date change signal from the timepiece 65. FIG. 11 shows this process for illustrative purposes. When a day change signal is produced from the timepiece once a day (step 231), 1 is subtracted from D only when D is not 0, by the same steps as steps 222 to 228. The result is stored in the location 95 for the renewal of D (steps 232–238).

When a plurality of maids are available for a multiplicity of rooms, each of the maids is assigned predetermined rooms for cleaning so that each of the rooms may be unlocked only by the maid in charge thereof. Further to avoid trouble that would occur when the maid in charge changes or the maid card is lost, it is desirable that the maid card, like the guest card, be adapted for the renewal of the secret number.

Although the presence of the room number N distinguishes the guest card from the maid card according to the embodiment described, the magnetic stripe on the card may have recorded thereon an identification code for identifying the type of the card. In this case, a code representing the guest and another code representing the maid are stored in the RAM 90. After the hotel code H has been checked, the identification code read from the card is compared with that stored in RAM 90 so that the card is further processed in accordance with the result.

While the length of stay of the guest is expressed in days with one day used as the unit time, one hour may be used as the unit time for measuring time, such that the data relating to the length of stay and stored in the memory can be reduced upon lapse of a predetermined number of unit hours, e.g. every 6 or 12 hours.

Instead of using two subnumbers A and B, three or four subnumbers may be prepared so that one or a plurality of subnumbers will be selected by the specifying code C. In this case, the code C is not one of two values, i.e. 0 or 1, but is selected from three or more values. With the embodiment described, either one of the subnumbers A2 and B2 is selected with use of previous C1, when current G2 is prepared by the card issuing device 1 and also when the unlocking unit 10 checks whether or not previous G1 and current G2 are in the relation of Equation (1). The current specifying code C2 is of course usable for this purpose.

Figure 12:
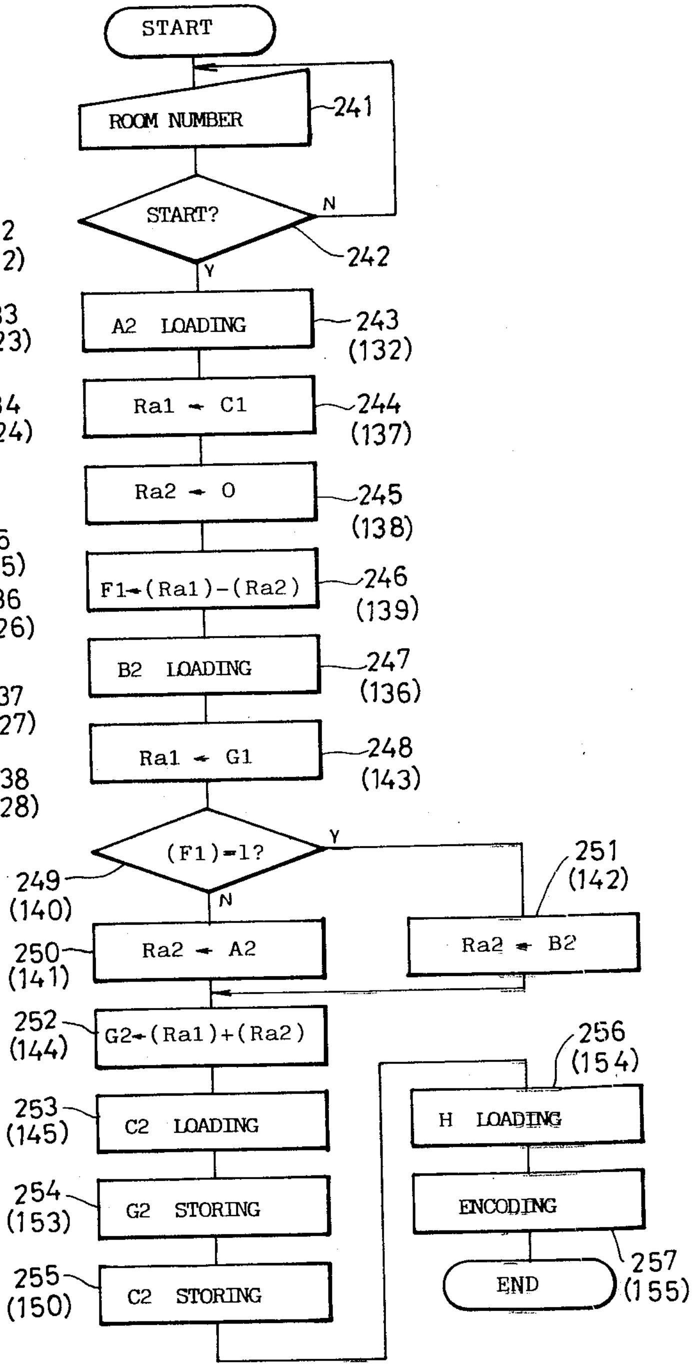
FIG. 12 is a flow chart showing a simplified card issuing procedure.

FIG. 12 shows a more simplified card issuing process, in which the stay day number is not considered at all. Accordingly the day number D is neither recorded on the card, nor is it stored in the data area of RAM 40 for each room. The register 37 is unnecessary. The rooms are not divided into classes. FIG. 12 does not show the process for addressing the locations in RAM 40.

The numbers indicating vacant rooms are given on a display (not shown). With reference to the display, the hotel clerk enters the number of an unoccupied room with use of the keyboard 15 (step 241). The keyed-in room number is loaded into the register 32. The keyboard 15 has a start key, which, when depressed (step 242), step 243 et seq. are performed. The process from step 243 through 257 is almost the same as the process from step 132 through 155 in FIG. 7 although different in order. Each of the steps in FIG. 12 is given in parentheses the corresponding step number shown in FIG. 7 and will not be described.

Figure 13:
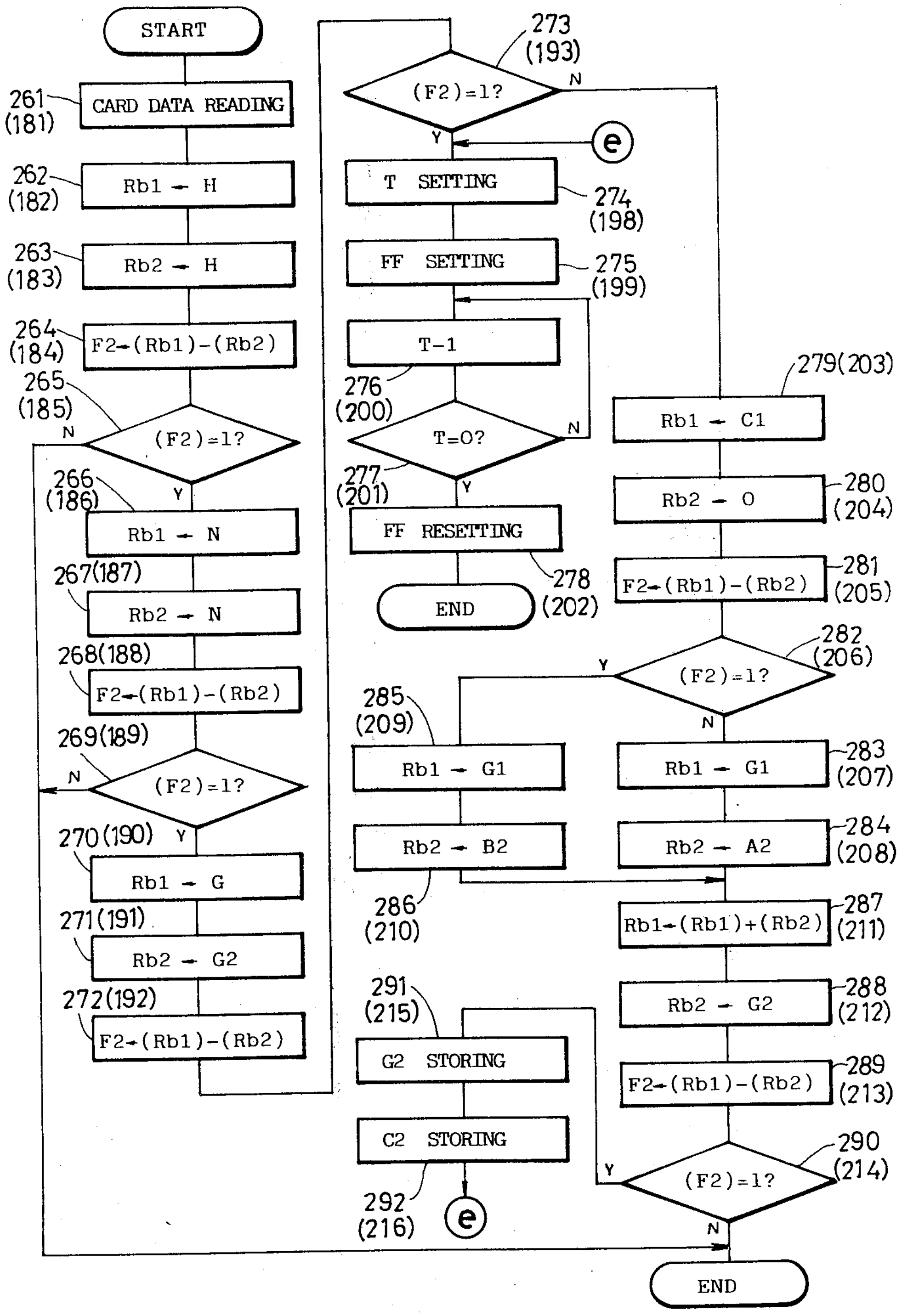
FIG. 13 is a flow chart showing the operation of the unlocking unit with use of a card issued by the procedure of FIG. 12.

FIG. 13 shows the unlocking process of the unlocking unit 10 executed with use of a card prepared by the process of FIG. 12. The card bears no stay day number, while no maid card is used, so that RAM 90 of the unit 10 need not include the locations for D and G0. The register 87 is not necessary, either. The process of FIG. 13 is substantially the same as the process shown in FIG. 10, exclusive of checking of the stay day number (steps 194–197), checking of the maid card (steps 218–221) and renewal of the stay day number with use of the maid card (steps 222–228). Each of the steps of FIG. 13 is given the corresponding step number shown in FIG. 10.

Figure 14:
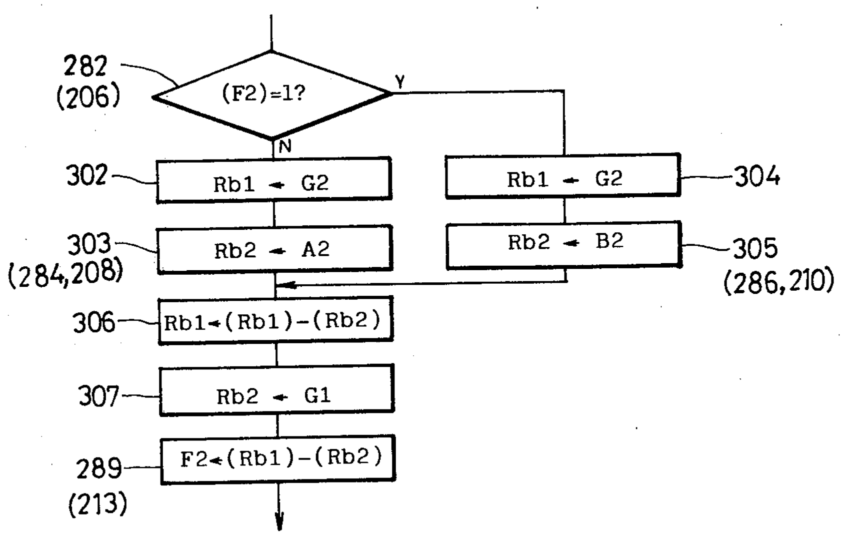
FIG. 14 is a flow chart showing another method of checking the secret number.

In steps 283–289 (steps 207–213), A2 or B2 is added to previous G1, and whether or not the result of the addition matches current G2 is checked. Alternatively A2 or B2 may be subtracted from current G2, and whether or not the result matches previous G1 may be checked. FIG. 14 shows this process. First, current G2 is transferred from the register 83 to Rb1 (steps 302, 304). Subsequently, in accordance with the state of F2, A2 or B2 is transferred from the register 85 or 86 to Rb2 (step 303 or 305). Rb2 is subtracted from Rb1, and the result is loaded into Rb1 (step 306). G1 in the location 93 of RAM 90 is transferred to Rb2 (step 307). Rb2 is subtracted from Rb1. F2 is set to 1 or 0 according to the subtraction result (steps 289 and 213).

In place of a master key for unlocking all or some of the rooms of a hotel, it is possible to prepare a card having a function equivalent to that of the master key. Such a card will be termed a "master card," to which the unlocking unit 10 is applicable. A code identifying the master card, secret number, specifying code and subnumbers are recorded on a magnetic stripe on the master card. On the other hand, a code for identifying the master card, secret number and previous specifying code are stored in specified locations of RAM 90. The data on the master card is read by the card reader 6, which first checks whether or not the two card identifying codes are identical. When they are found to match, the secret number on the card and that in RAM 90 are checked for a match. The lock is opened when the two numbers are found identical.

If the master card is lost or when there arises a need to change the secret number on the card, a master card is issued bearing a secret number and subnumber which satisfy the relation of Equation (1), for example, with use of previous secret number and specifying code. When the new master card is used for unlocking, steps similar to steps 279–292 (203–316) are executed to check whether or not the previous and current secret numbers are in a predetermined relation, subject to the condition that the master card identifying codes are identical. When the two secret numbers are found to be in the predetermined relation, the secret number and specifying code in RAM 90 are renewed. After the secret number has been renewed, the locks concerned are openable only with the new master card and can not be opened with the previous master card. Such a master card will be used suitably by maid supervisors and managers.

Figure 16A:
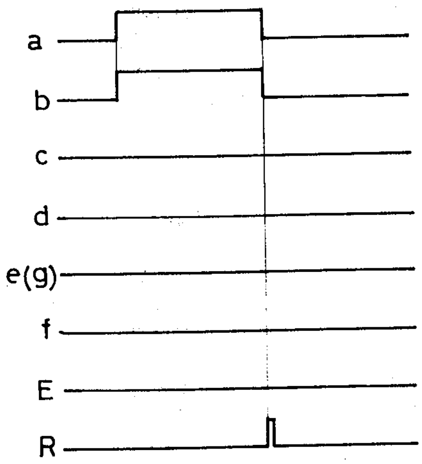
FIG. 16 is a time chart showing the operation of the unlocking unit of FIG. 15.
Figure 16B:
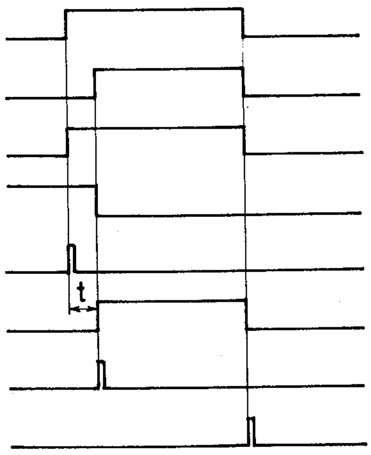
Figure 15:
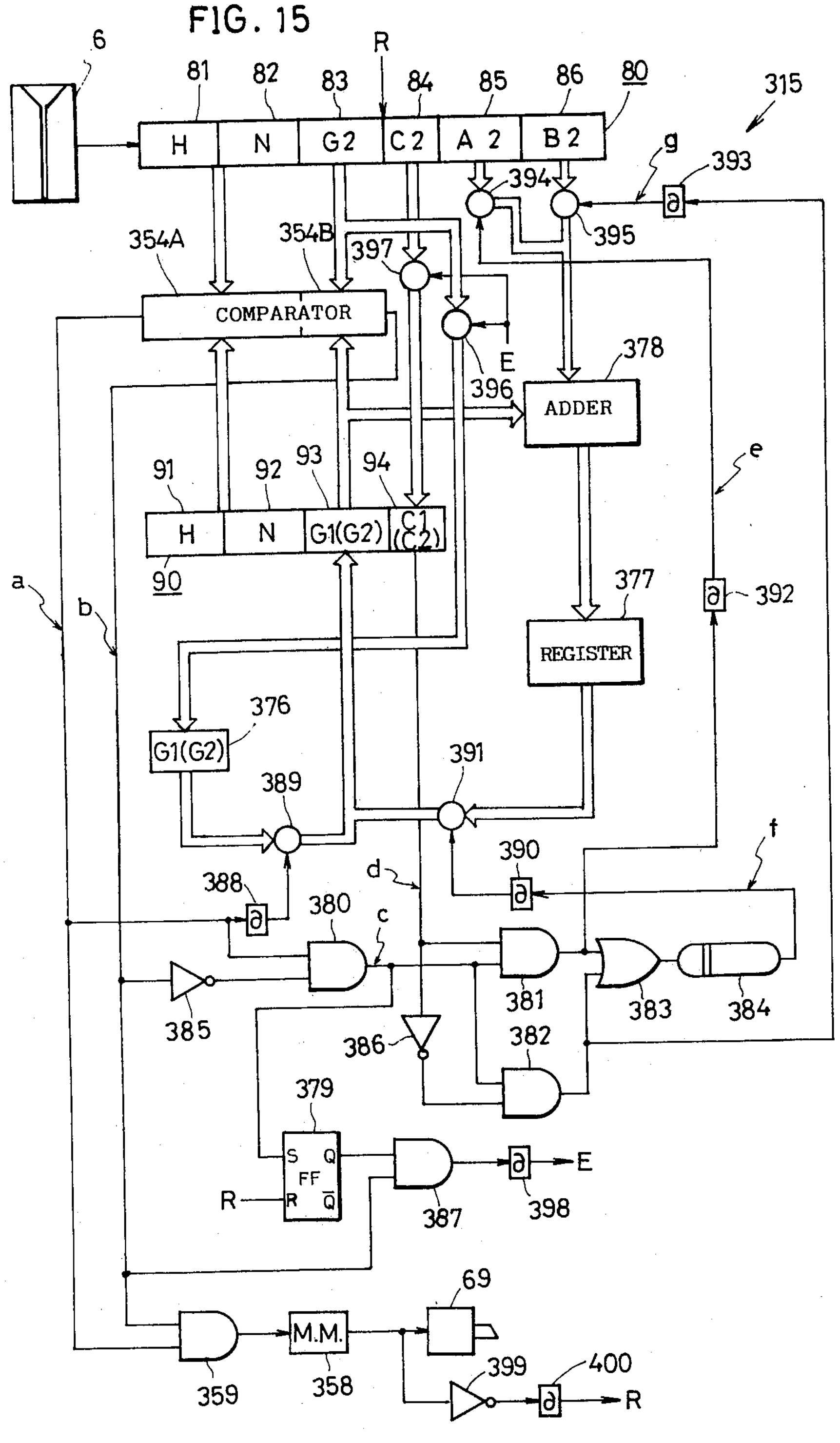
FIG. 15 is a block diagram showing another embodiment of unlocking unit.

While the unlocking unit 10 is adapted for use with a central processing unit, especially with a microprocessor, the unlocking unit can be composed of various logical circuits in combination as seen in FIG. 15. FIG. 16 shows output signals from circuits included in the unlocking unit 315 shown in FIG. 15. More specifically, FIG. 16*a* shows the operation in a steady state which does not involve, for example, renewal of the secret number, and FIG. 16*b* shows an operation involving renewal of the secret number. FIG. 15 shows a card reader 6, a group of registers 80, a first memory 90 and a solenoid 69, which, for convenience sake, are given the same reference numerals as the card reader, group of registers, RAM and solenoid shown in FIG. 9, respectively. The unit 315 of FIG. 15 has functions equivalent to those illustrated in the flow chart of FIG. 13.

It is assumed that a second memory 376 has stored therein G1 or G2 read from a card 2 in the preceding unlocking operation. A flip-flop 379 has been preset. The card data H, N, G2, C2, A2, B2 read by the card reader 6 is stored in the registers 81-86 of the group 80. The first memory 90 has stored therein a hotel code H, room number N, secret numbers G1 (G2) and specifying code C1 (C2). The hotel codes H and room numbers N in the registers 81, 82 and the first memory 90 are compared by a comparator 354A, and when they are found identical, a match signal a is produced. The match signal a is fed to a differentiation circuit 388, which produces an output to open a gate 389. The secret number G stored in the second memory 376 is transferred to an area 93 of the first memory 90. The G's of the register 83 and area 93 are compared in a comparator 354B. When they are found identical, a match signal b is generated. The two match signals a and b are sent to an AND circuit 359, which in turn produces an output to actuate a monostable multivibrator 358. The multivibrator 358 produces an output for a predetermined period of time (corresponding to the time setting T for the timer 67) to energize the solenoid 69 and open the lock for the predetermined period of time. When the output from the multivibrator 358 falls upon lapse of the time, the output from a NOT circuit 399 rises. This is detected by a differentiation circuit 400, giving a reset signal R. The register group 80 is reset by the reset signal R and is cleared of the data, and at the same time, the flip-flop 379 is reset.

If the hotel codes H and room numbers N, or the secret numbers G in the register group 80 and first memory 90 are not identical, at least one of the match signals a and b is not produced, so that the lock will not be opened.

In the presence of the signal a because the hotel codes H and room numbers N are identical respectively, but in the absence of the match signal b since the secret numbers G are not identical, a signal given by a NOT circuit 385 causes an AND circuit 380 to produce a signal c, which is fed to AND circuits 381, 382 and also to the flip-flop 379, which is therefore set. A signal d represents the state of the specifying code C1 stored in the first memory 90. If the code C1 is 1, the signal d is produced, causing the AND circuit 381 to produce an output, which is detected by a differentiation circuit 392. The circuit 392 in turn generates a signal e to open a gate 394, whereby the subnumber A2 is selected. The number A2 is sent to an adder 378. When the specifying code C1 is 0, the signal d is not given, with the result that the NOT circuit 382 generates an output which causes the AND circuit 382 to produce an output. This output is detected by a differentiation circuit 393, which produces an output signal g, thereby opening a gate 395. As a result, the subnumber B2 is sent to the adder 378.

The secret number G1 stored in the area 93 of the first memory 90 is added to the subnumber A2 or B2 selected by the specifying code C1 in the adder 378, and the result is stored in a memory circuit 377. Since the output of the AND circuit 381 or 382 is given via an OR circuit 383 to a timer 384, the timer 384 produces, upon lapse of a predetermined period of time t, an output f, which is detected by a differentiation circuit 390. The circuit 390 produces an output, which opens a gate 391. The addition result given by the adder 378 is transferred from the circuit 377 to the area 93 of the first memory 90.

When the secret number G2 in the register 83 matches the addition result stored in the area 93 of the first memory 90, the comparator 354B produces a match signal b. Since the flip-flop 379 has been set by the signal c, the signal b causes an AND circuit 387 to produce an output, which is detected by a differentiation circuit 398 to give a signal E. The signal E opens gates 396 and 397. G2 in the register 83 is stored in the second memory 376, and C2 in the register 84 is stored in the area 94 of the memory 90.

On the other hand, the match signal b causes the multivibrator 358 to produce a signal which holds the lock open for the predetermined period of time, upon the lapse of which a reset signal R is given in the manner already described. When G2 read from the card 2 and G1 stored in the memory 90 are found to be in the relation of Equation (1), the lock is opened in this way, and G2 and C2 read from the card 2 are stored in the memory 90 for renewal.

The card issuing device can of course be composed of logical circuits in combination, similarly.

Although G2 in the register 83 is sent to and stored in the second memory 376 with use of the signal E in the above embodiment, the stored data (circuit 377) given by the adder 378, or the data stored in the area 93 of the first memory 90 may be sent to and stored in the second memory 376.

What is claimed is:

1. An unlocking system for use with cards each having recorded thereon a secret number, a plurality of subnumbers and a specifying code for selecting at least one of the subnumbers, comprising:

a card reader for reading the data recorded on the card, a memory for storing at least a secret number, electric unlocking means, first control means for comparing the secret number on the card with the secret number in the memory to give an unlocking instruction to the electric unlocking means when a match is found between the two secret numbers, and second control means for checking whether or not the secret number on the card and the secret number in the memory are in a predetermined relation established with use of the subnumber selected by the specifying code from among the plurality of subnumbers to give an unlocking instruction to the electric unlocking means and to store the secret number of the card in the memory for the renewal of the secret number in the memory, when the secret number on the card and the secret number in the memory are in the predetermined relation.

2. An unlocking system as defined in claim 1 wherein the subnumbers are random numbers.

3. An unlocking system as defined in claim 1 wherein the memory has stored therein a secret number and a specifying code, and the second control means checks whether or not the secret number on the card and the secret number in the memory are in a predetermined relation established with use of the subnumber selected by the specifying code of the memory from among the subnumbers on the card to give an unlocking instruction to the electric unlocking means and to store the secret number and the specifying code of the card in the memory for the renewal of the secret number of and the specifying code in the memory, when the secret number on the card and the secret number in the memory are in the predetermined relation.

4. An unlocking system for use with cards each having recorded thereon a secret number, a plurality of subnumbers, a specifying code for selecting at least one of subnumber, and an effective period, comprising:

a card reader for reading the data recorded on the card, a memory for storing at least a secret number and an effective period, first control means for reducing the effective period stored in the memory by 1 in terms of unit time upon lapse of every unit time, second control means for producing an unlocking signal when the secret number on the card is identical with the secret number of the memory, with the effective period in the memory exceeding a predetermined period, and third control means for producing an unlocking instruction and storing the secret number and the effective period on the card in the memory when the secret number on the card and the secret number in the memory are in a predetermined relation established with use of the subnumber selected by the specifying code from among the plurality of subnumbers.

5. An unlocking system as defined in claim 4 wherein the effective periods are in terms of effective day number, and the first control means reduces the effective day number in the memory by 1 upon lapse of every day.

6. An unlocking system as defined in claim 4 which further comprises a time measuring unit and in which the first control means reduces the effective period in the memory in response to an output from the time measuring unit.

7. An unlocking system as defined in claim 4 which is operable also with use of a forced unlocking card having recorded therein a forced unlocking secret number and in which the memory has stored therein a forced unlocking secret number, the first control means being operative to produce an unlocking signal and to reduce the effective period in the memory by 1 in terms of unit time when the secret number on the forced unlocking card is identical with the forced unlocking secret number in the memory.

8. An unlocking system as defined in claim 4 wherein the memory has stored therein a secret number, an effective period and a specifying code, and the third control means produces an unlocking instruction and stores the secret number, the effective period and the specifying code of the card in the memory when the secret number on the card and the secret number in the memory are in a predetermined relation established with use of the subnumber selected by the specifying code in the memory from among the plurality of subnumbers on the card.

9. A card issuing device comprising:

a numerical value generator for generating a plurality of subnumbers and a specifying code for selecting at least one of the plurality of subnumbers, a memory for storing a previous secret number and a previous specifying code, a processing unit for preparing a current secret number in a predetermined relation with the previous secret number with use of the previous secret number in the memory and the subnumber selected by the previous specifying code in the memory from among a plurality of current subnumbers obtained from the numerical value generator, a memory control unit for storing in the memory the current secret number and a current specifying code obtained from the numerical value generator, and means for recording on a card the current secret number prepared, and the plurality of current subnumbers and the current specifying code obtained from the numerical value generator.

10. A card issuing device as defined in claim 9 wherein the subnumbers are random numbers.

11. A card issuing device as defined in claim 9 wherein the current specifying code is irrelevant to the previous specifying code.

12. A card issuing device as defined in claim 9 which further comprises means for entering an effective period and in which the recording means records on the card the current secret number prepared, the plurality of current subnumbers and the current specifying code obtained from the numerical value generator, and the effective period entered.

* * * * *